US010635674B2

(12) United States Patent
Jain et al.

(10) Patent No.: US 10,635,674 B2
(45) Date of Patent: Apr. 28, 2020

(54) MIGRATING A PLUGGABLE DATABASE BETWEEN DATABASE SERVER INSTANCES WITH MINIMAL IMPACT TO PERFORMANCE

(71) Applicant: Oracle International Corporation, Redwood Shores, CA (US)

(72) Inventors: Sanket Jain, Sunnyvale, CA (US); Kumar Rajamani, San Ramon, CA (US); Jaebock Lee, Sunnyvale, CA (US); Nicolas Michael, San Francisco, CA (US); Yixiao Shen, San Ramon, CA (US); Giridhar Ravipati, Foster City, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 908 days.

(21) Appl. No.: 15/093,506

(22) Filed: Apr. 7, 2016

(65) Prior Publication Data

US 2017/0116213 A1    Apr. 27, 2017

Related U.S. Application Data

(60) Provisional application No. 62/245,937, filed on Oct. 23, 2015.

(51) Int. Cl.
*G06F 16/2455* (2019.01)
*G06F 16/172* (2019.01)
(Continued)

(52) U.S. Cl.
CPC ...... *G06F 16/24566* (2019.01); *G06F 16/172* (2019.01); *G06F 16/214* (2019.01); *G06F 16/258* (2019.01)

(58) Field of Classification Search
CPC ............. G06F 16/24566; G06F 16/214; G06F 16/258; G06F 16/172
See application file for complete search history.

(56) References Cited

U.S. PATENT DOCUMENTS 6,185,699 B1    2/2001   Haderle
6,205,449 B1    3/2001   Rastogi
(Continued)

OTHER PUBLICATIONS

"Database Live Migration with Oracle Multitenant and the Oracle Universal Connection Pool (UCP) on Oracle Real Application Clusters (RAC)" Oct. 15, 2014, Oracle White Paper, 12pgs (Year: 2014).*

(Continued)

*Primary Examiner* — Alicia M Willoughby
(74) *Attorney, Agent, or Firm* — Hickman Palermo Becker Bingham LLP (57) ABSTRACT

Embodiments provide a migration instruction that effectuates the migration of a pluggable database from a source database server instance to a destination database server instance. Upon receiving the migration instruction, the migrating pluggable database is opened at the destination instance. Connections are terminated at the source instance at a rate that is determined based on statistics maintained for one or more of: the migrating pluggable database, the source instance, the destination instance, a container database, etc. Furthermore, once the migration instruction is received, a certain amount of time is provided before the source instance flushes the dirty buffers for the migrating pluggable database from the buffer cache of the source instance. The delay in flushing dirty buffers from buffer cache allows the source instance to provide data blocks, of the migrating pluggable database, directly to the destination database server instance from the cache.

24 Claims, 6 Drawing Sheets

(51) Int. Cl.
  *G06F 16/25* (2019.01)
  *G06F 16/21* (2019.01)

(56) References Cited

U.S. PATENT DOCUMENTS

| | | | |
|---|---|---|---|
| 6,226,650 B1 | 5/2001 | Mahajan | |
| 6,295,610 B1 | 9/2001 | Ganesh | |
| 6,502,102 B1 | 12/2002 | Haswell | |
| 6,633,878 B1 | 10/2003 | Underwood | |
| 6,638,878 B2 | 10/2003 | Restaino | |
| 6,804,671 B1 | 10/2004 | Loaiza et al. | |
| 6,973,647 B2 | 12/2005 | Crudele | |
| 7,136,857 B2 | 11/2006 | Chen | |
| 7,305,421 B2 | 12/2007 | Cha | |
| 7,418,435 B1 | 8/2008 | Sedlar | |
| 7,571,173 B2 | 8/2009 | Yang | |
| 7,620,620 B1 | 11/2009 | Sedlar | |
| 7,620,623 B2 | 11/2009 | Sedlar | |
| 8,065,320 B2 | 11/2011 | Sedlar | |
| 8,117,174 B2 | 2/2012 | Shaughessey | |
| 8,161,085 B2 | 4/2012 | Souder | |
| 8,364,648 B1 | 1/2013 | Sim-Tang | |
| 8,478,718 B1 | 7/2013 | Ranade | |
| 8,554,762 B1 | 10/2013 | O'Neill | |
| 9,026,679 B1 | 5/2015 | Shmuylovich | |
| 9,280,591 B1 | 3/2016 | Kharatishvili | |
| 9,298,564 B2 | 3/2016 | Lee | |
| 9,390,120 B1 | 7/2016 | Gulliver | |
| 9,396,220 B2 | 7/2016 | Li | |
| 9,507,843 B1 | 11/2016 | Madhavarapu | |
| 9,684,561 B1 | 6/2017 | Yan | |
| 9,940,203 B1 | 4/2018 | Ghatnekar | |
| 2002/0112022 A1 | 8/2002 | Kazar et al. | |
| 2002/0143733 A1 | 10/2002 | Mukkamalla | |
| 2003/0074360 A1 | 4/2003 | Chen | |
| 2004/0039962 A1 | 2/2004 | Ganesh | |
| 2004/0054643 A1 | 3/2004 | Vermuri | |
| 2004/0054644 A1 | 3/2004 | Ganesh | |
| 2004/0177099 A1 | 9/2004 | Ganesh | |
| 2004/0210577 A1 | 10/2004 | Kundu | |
| 2005/0038831 A1 | 2/2005 | Souder et al. | |
| 2005/0256908 A1 | 11/2005 | Yang | |
| 2005/0283478 A1 | 12/2005 | Choi | |
| 2005/0289213 A1 | 12/2005 | Newport | |
| 2006/0047626 A1 | 3/2006 | Raheem | |
| 2006/0047713 A1 | 3/2006 | Gornshtein | |
| 2006/0206489 A1 | 9/2006 | Finnie | |
| 2007/0083563 A1 | 4/2007 | Souder | |
| 2007/0100912 A1 | 5/2007 | Pareek et al. | |
| 2007/0244918 A1 | 10/2007 | Lee et al. | |
| 2009/0282203 A1 | 11/2009 | Haustein | |
| 2010/0211756 A1 | 8/2010 | Kaminski | |
| 2010/0318570 A1 | 12/2010 | Narasinghanallur et al. | |
| 2011/0047555 A1 | 2/2011 | Lakshmanan | |
| 2011/0060724 A1 | 3/2011 | Chan | |
| 2011/0087633 A1 | 4/2011 | Kreuder et al. | |
| 2011/0307450 A1 | 12/2011 | Hahn et al. | |
| 2012/0109926 A1 | 5/2012 | Novik et al. | |
| 2012/0284228 A1 | 11/2012 | Ghosh | |
| 2012/0284544 A1* | 11/2012 | Xian | G06F 12/0804 713/320 |
| 2012/0287282 A1 | 11/2012 | Lu | |
| 2012/0323849 A1 | 12/2012 | Garin | |
| 2013/0085742 A1 | 4/2013 | Baker et al. | |
| 2013/0085998 A1 | 4/2013 | Barker | |
| 2013/0117237 A1 | 5/2013 | Thomsen et al. | |
| 2013/0198133 A1 | 8/2013 | Lee | |
| 2014/0033220 A1 | 1/2014 | Campbell | |
| 2014/0095452 A1 | 4/2014 | Lee et al. | |
| 2014/0095530 A1 | 4/2014 | Lee et al. | |
| 2014/0095546 A1 | 4/2014 | Kruglikov et al. | |
| 2014/0164331 A1 | 6/2014 | Li et al. | |
| 2014/0188804 A1 | 7/2014 | Gokhale | |
| 2014/0258241 A1 | 9/2014 | Chen | |
| 2015/0032694 A1 | 1/2015 | Rajamani et al. | |
| 2015/0120659 A1 | 4/2015 | Srivastava | |
| 2015/0134626 A1 | 5/2015 | Theimer | |
| 2015/0254240 A1 | 9/2015 | Li et al. | |
| 2016/0117779 A1 | 4/2016 | Sale | |
| 2016/0170978 A1 | 6/2016 | Michael et al. | |
| 2016/0188621 A1 | 6/2016 | Karinta et al. | |
| 2016/0352836 A1* | 12/2016 | Kamalakantha | G06F 9/4856 |
| 2017/0048314 A1* | 2/2017 | Aerdts | G06F 9/5083 |
| 2017/0116207 A1 | 4/2017 | Lee | |
| 2017/0116249 A1 | 4/2017 | Ravipati | |
| 2017/0116298 A1 | 4/2017 | Ravipati | |
| 2017/0220271 A1 | 8/2017 | Muthukrishnan | |
| 2017/0315877 A1 | 11/2017 | Kaplingat | |
| 2017/0357550 A1 | 12/2017 | Jain | |
| 2018/0060177 A1 | 3/2018 | Shanthaveerappa | |
| 2018/0060181 A1 | 3/2018 | Rajamani | |
| 2018/0075044 A1 | 3/2018 | Kruglikov | |
| 2018/0075086 A1 | 3/2018 | Yam | |

OTHER PUBLICATIONS

Sata's DBA Blog: "Oracle Statistics", dated Jan. 3, 2013, http://satya-dba.blogspot.com/2010/06/oracle-database-statistics-rbo-cbo.html, 14 pages.
Rajeev Kumar et al., Oracle DBA, A Helping Hand, Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Oracle Base, Multitenant: Create and Configure a Pluggable Database (PDB) in Oracle Database 12c Release 1 (12.1), dated Jan. 8, 2014, 16 pages.
Muhammad Anwar, "How to Install Oracle 12c Multitenant Pluggable Database", dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud," 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
Michael et al., "Downtime-Free Live Migration in a Multitenant Database", Computer Science vol. 8904, dated Feb. 5, 2015, 25 pages.

* cited by examiner

302 — RECEIVE, FROM A CLIENT, AN INSTRUCTION TO MIGRATE HOSTING OF A PARTICULAR PLUGGABLE DATABASE FROM A SOURCE DATABASE SERVER INSTANCE TO A DESTINATION DATABASE SERVER INSTANCE; WHEREIN, AT THE TIME THE INSTRUCTION IS RECEIVED, THE SOURCE DATABASE SERVER INSTANCE MANAGES A PLURALITY OF CONNECTIONS TO THE PARTICULAR PLUGGABLE DATABASE

304 — INITIATE SERVICE OF THE PARTICULAR PLUGGABLE DATABASE AT THE DESTINATION DATABASE SERVER INSTANCE

306 — WHILE MAINTAINING ONE OR MORE FIRST CONNECTIONS OF THE PLURALITY OF CONNECTIONS AT THE SOURCE DATABASE SERVER INSTANCE, CLOSE ONE OR MORE SECOND CONNECTIONS OF THE PLURALITY OF CONNECTIONS AT THE SOURCE DATABASE SERVER INSTANCE

308 — CLOSE THE ONE OR MORE FIRST CONNECTIONS OF THE PLURALITY OF CONNECTIONS AT THE SOURCE DATABASE SERVER INSTANCE

310 — TERMINATE SERVICE OF THE PARTICULAR PLUGGABLE DATABASE AT THE SOURCE DATABASE SERVER INSTANCE

FIG. 4

MIGRATING A PLUGGABLE DATABASE BETWEEN DATABASE SERVER INSTANCES WITH MINIMAL IMPACT TO PERFORMANCE

CROSS-REFERENCE TO RELATED APPLICATIONS; BENEFIT CLAIM

This application claims the benefit of Provisional Appln. 62/245,937, titled "Application Containers in Container Databases", filed Oct. 23, 2015, the entire contents of which is hereby incorporated by reference as if fully set forth herein, under 35 U.S.C. § 119(e).

This application is related to the following applications/patents, each of which is incorporated by reference as if fully set forth herein:

Application Ser. No. 13/631,815, filed Sep. 28, 2012, titled "Container Database"; and U.S. Pat. No. 6,353,836, filed Nov. 24, 1998, titled "Method And Apparatus For Transferring Data From The Cache Of One Node To The Cache Of Another Node".

FIELD OF THE INVENTION

The present invention relates to migration of pluggable database service between database server instances running on a cluster of nodes, and, more specifically, to minimizing negative impact of pluggable database service migration on a destination database server instance to which service of a pluggable database is migrated.

BACKGROUND

Database consolidation involves distributing and sharing computing resources among multiple databases. Databases may be consolidated using a container database management system. A consolidated database, such as a multitenant container database (CDB), includes one or more pluggable databases (PDBs). In a container database management system, each pluggable database may be open or closed in the container database independently from other pluggable databases.

Pluggable databases may be "plugged in" to a container database, and may be transported between database servers and/or DBMSs. The container database may manage multiple pluggable databases and a given database server instance may serve those pluggable databases from the container database. As such, a given container database allows multiple pluggable databases to run on the same database server and/or database server instance, allowing the computing resources of a single database server or instance to be shared between multiple pluggable databases.

An application may access a pluggable database by establishing a database session on the container database management system for that pluggable database, where a database session represents the connection between an application and the pluggable database. A database session is initiated for a pluggable database by, for example, transmitting a request for a new connection to the container database management system, the request specifying the pluggable database. A container database management system may host multiple database sessions, each database session being for one of multiple pluggable databases.

At times, it is necessary to move hosting of a particular PDB, included in a particular CDB, between database server instances that are serving data from the CDB. Generally, to migrate service of a PDB from a source database server instance to a destination database server instance, the source database server instance stops serving the PDB and the destination database server instance initiates service to the PDB.

Such change of service may cause data management problems. For example, once the source database server instance stops serving the PDB that is being migrated, the destination database server instance may be inundated with costly connection initiation requests. Such a wave of connection requests can significantly impact performance of the destination database server instance. Furthermore, the resources of the destination database server instance are further taxed by retrieving data for the migrated PDB from persistent storage in order to begin servicing the PDB.

Thus, the amount of processing power required to start service of a migrated PDB at the destination database server instance generally impacts the performance of applications that require resources that are accessed through the destination database server instance. As such, it would be beneficial to provide a way of migrating a PDB between database server instances to minimize the impact on application performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Migration of pluggable database service between database server instances, residing on the nodes of a cluster, can tax the resources of the node to which the pluggable database service is moved. Embodiments provide a single migration instruction that effectuates the migration of a pluggable database from a source database server instance to a destination database server instance, where both the source and destination database server instances service a particular container database that contains the migrating pluggable database.

Upon receiving the migration instruction, the migrating pluggable database is opened at the destination database server instance. Connections are terminated at the source database server instance at a rate that is determined based on statistics maintained for one or more of: the migrating pluggable database, the source instance, the destination instance, a container database, etc. This gradual termination of connections at the source database server instance prevents the destination database server instance from being inundated with connection initiation requests.

Furthermore, once the migration instruction is received, a certain amount of time is provided before the source database server instance flushes the dirty buffers for the migrating pluggable database from the buffer cache of the source database server instance. As with the rate of connection termination, the certain amount of time is determined based on statistics maintained for one or more of: the migrating pluggable database, the source instance, the destination instance, a container database, etc. The delay in flushing dirty buffers from buffer cache allows the source database server instance to provide data blocks, of the migrating pluggable database, directly to the destination database server instance from the cache.

As such, embodiments allow for utilization of resources to migrate service of a pluggable database such that application performance is minimally impacted by the migration.

Figure 1:
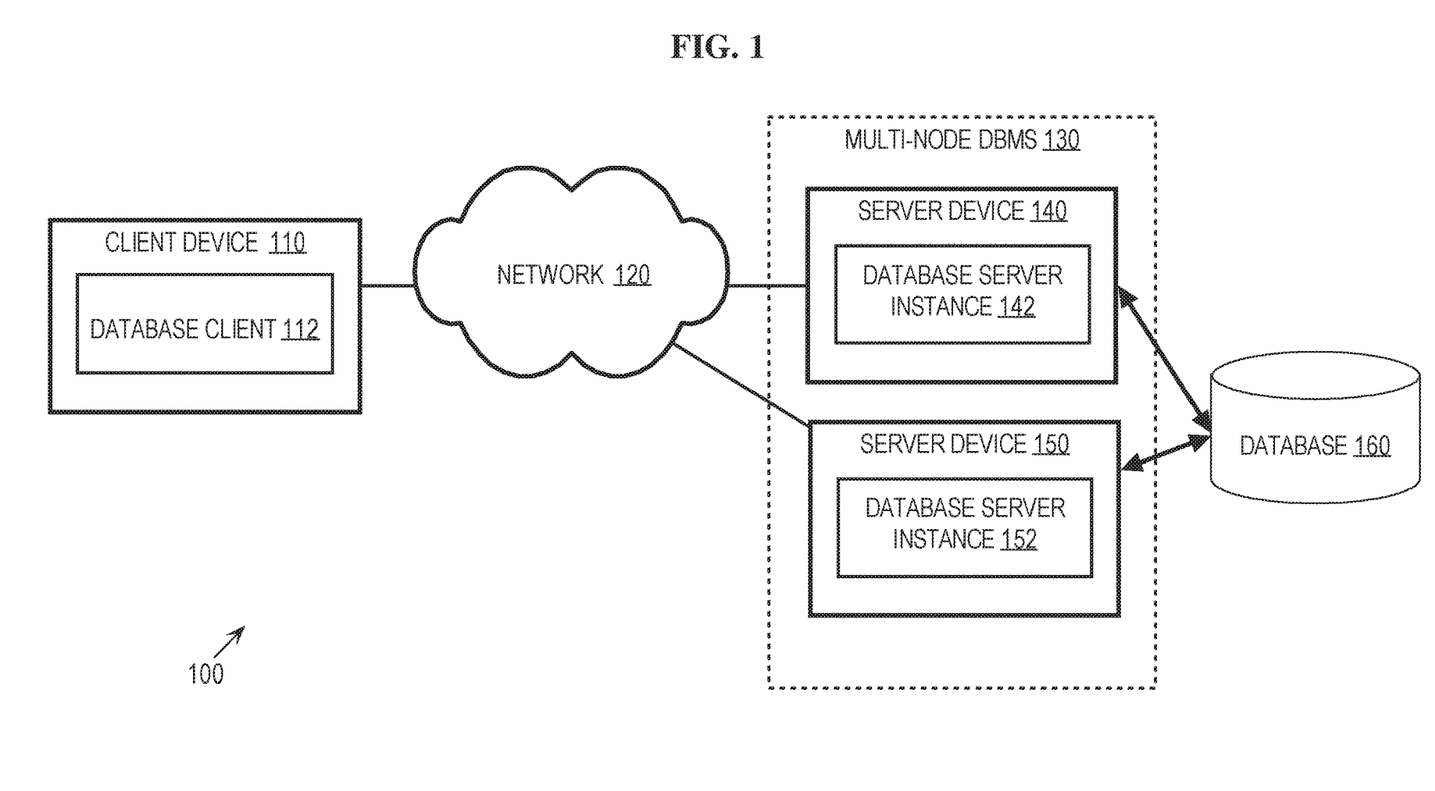
FIG. 1 is a block diagram that depicts an example network arrangement for migration of a pluggable database between database server instances.

Architecture for Migration of a Pluggable Database Between Database Server Instances FIG. 1 is a block diagram that depicts an example network arrangement 100 for migration of a pluggable database between database server instances, according to embodiments. Network arrangement 100 includes a client device 110 and server devices 140 and 150 communicatively coupled via a network 120. Example network arrangement 100 may include other devices, including client devices, server devices, storage devices, and display devices, according to embodiments.

Client device 110 may be implemented by any type of computing device that is communicatively connected to network 120. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a database client 112. Database client 112 may be implemented in any number of ways, including as a standalone application running on client device 110, or as a plugin to a browser running at client device 110, etc. Database client 112 may be implemented by one or more logical modules. Client device 110 may be configured with other mechanisms, processes and functionalities, depending upon a particular implementation.

Network 120 may be implemented with any type of medium and/or mechanism that facilitates the exchange of information between client device 110 and any of server devices 140 and 150. Furthermore, network 120 may facilitate use of any type of communications protocol, and may be secured or unsecured, depending upon the requirements of a particular embodiment.

According to embodiments, server devices 140 and 150 are nodes of a cluster of nodes—managed by a multi-node database management system (DBMS) 130—that store and/or serve data from a database 160. According to an embodiment, multi-node DBMS 130 represents a shared-everything cluster database environment (such as Oracle Real Application Clusters ("RAC")). (See "Oracle Real Application Clusters (RAC)", An Oracle White Paper, June 2013, Oracle Database 12C documentation. The afore-referenced document is incorporated by reference as if fully set forth herein.)

According to embodiments, any number of nodes may be part of the node cluster managed by multi-node DBMS 130. Server devices 140 and 150 are implemented by any type of computing device that is capable of communicating with client device 110 over network 120 and capable of running a database server instance. Alternatively or additionally, one or more of server devices 140 and 150 comprise the nodes of a grid, which is composed of nodes in the form of server blades interconnected with other server blades on a rack.

In network arrangement 100, server devices 140 and 150 are configured with database server instances 142 and 152, respectively. Database server instances 142 and 152, installed on the nodes managed by multi-node DBMS 130, collectively implement the database server being managed by DBMS 130. Specifically, resources from multiple nodes in a multi-node database system can be allocated to run a particular database server's software. Each combination of the software and allocation of resources from a node is a server that is referred to herein as a "database server instance" or "instance".

A server, such as a database server, is a combination of integrated software components and an allocation of computational resources, such as memory, a node (i.e., a computing device), and processes on the node for executing the integrated software components on a processor, the combination of the software and computational resources being dedicated to performing a particular function on behalf of one or more clients (such as database client 112 on client device 110).

Server devices 140 and 150 share access to the same database (i.e., database 160). Specifically, according to embodiments, the all of the nodes of multi-node DBMS 130 (at least including server devices 140 and 150) share access, potentially in varying degrees, to shared storage that stores the data for database 160. According to an embodiment, this shared access comprises access to a set of disk drives (accessible by the nodes of multi-node DBMS 130 or on one or more of the nodes) and to data blocks stored thereon. Database 160 may reside in any type of storage, including volatile and non-volatile storage, e.g., random access memory (RAM), one or more hard disks, main memory, etc.

One or more of the functions attributed to server device 140 and/or 150 herein may be performed by services on other server devices that are communicatively coupled to network 120. Furthermore, any of the functionality attributed to database server instances 142 and 152 herein may be performed by another logical entity of network arrangement 100, according to embodiments. Also, database server instances 142 and 152 may each be implemented by one or more logical modules, and are described in further detail below. Server devices 140 and 150 may be configured with other mechanisms, processes and functionalities, depending upon a particular implementation.

In an embodiment, each of the processes and/or functionality described in connection with database client 112, database server instances 142 and 152, DBMS 130, and/or database 160 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Systems

Embodiments of the present invention are used in the context of database management systems (DBMSs). Therefore, a description of a DBMS is useful. A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with an instance of a database server of a DBMS by submitting, to the database server instance, commands that cause the database server instance to perform operations on data stored in a database. For example, a user at client device 110 submits a database server command to multi-node DBMS 130, via database client 112, which is received by a particular database server instance with which database client 112 maintains a connection, e.g., database server instance 142. A user may be one or more applications running on client device 110 that causes database client 112 to interact with database server instance 142. Multiple users may access database resources through a given application. Multiple users may also be referred to herein, collectively, as a user.

A database command may be in the form of a database statement that conforms to a database language. An illustrative example database language for expressing database commands is Structured Query Language (SQL). For example, data manipulation language (DML) instructions are issued to a DBMS to manage data stored within a database structure, and SELECT, INSERT, UPDATE, and DELETE are common examples of DML instructions found in SQL implementations.

Container Database and Pluggable Database Architecture

Figure 2A:
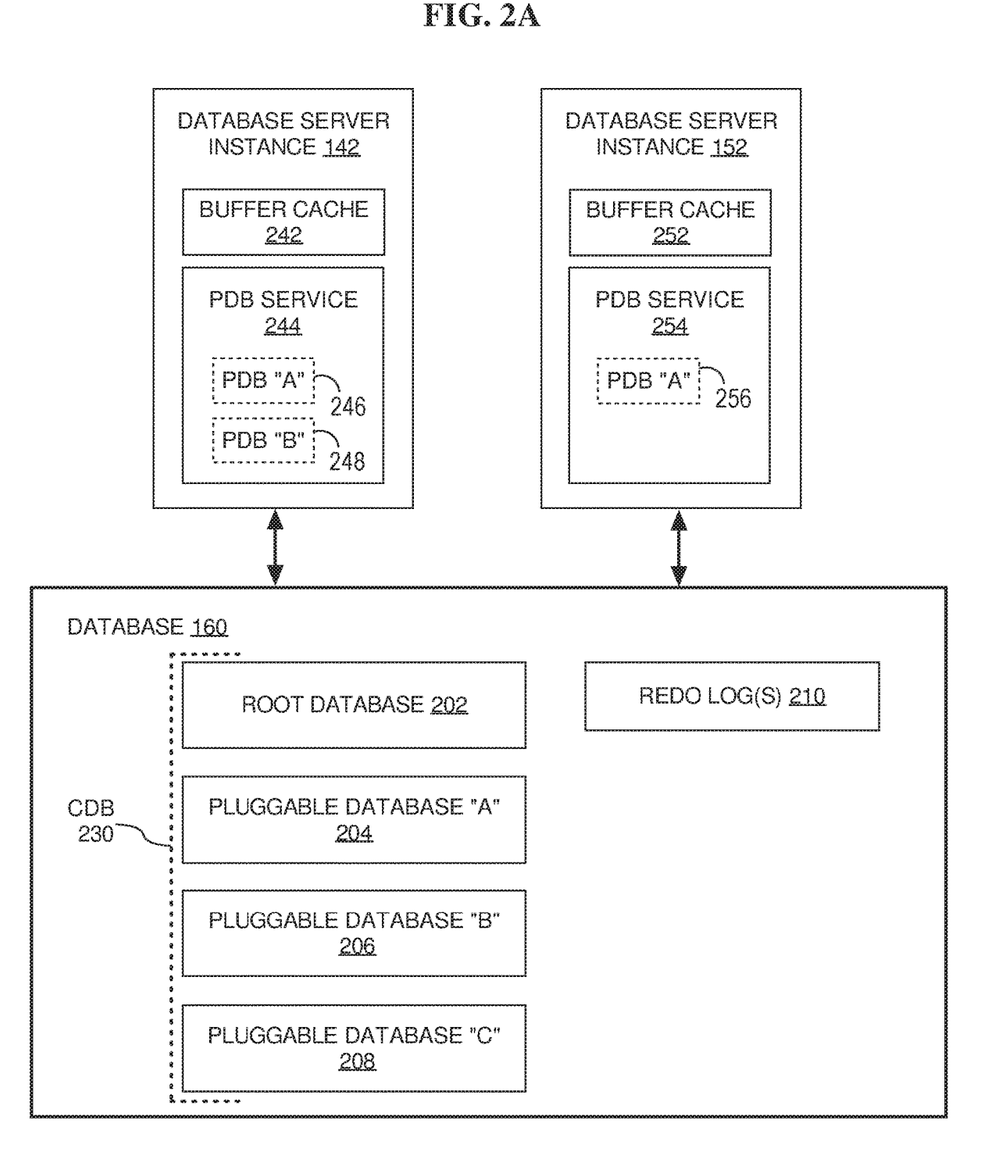
FIGS. 2A-2C depict example resource arrangements detailing database server instances and a database.
Figure 2B:
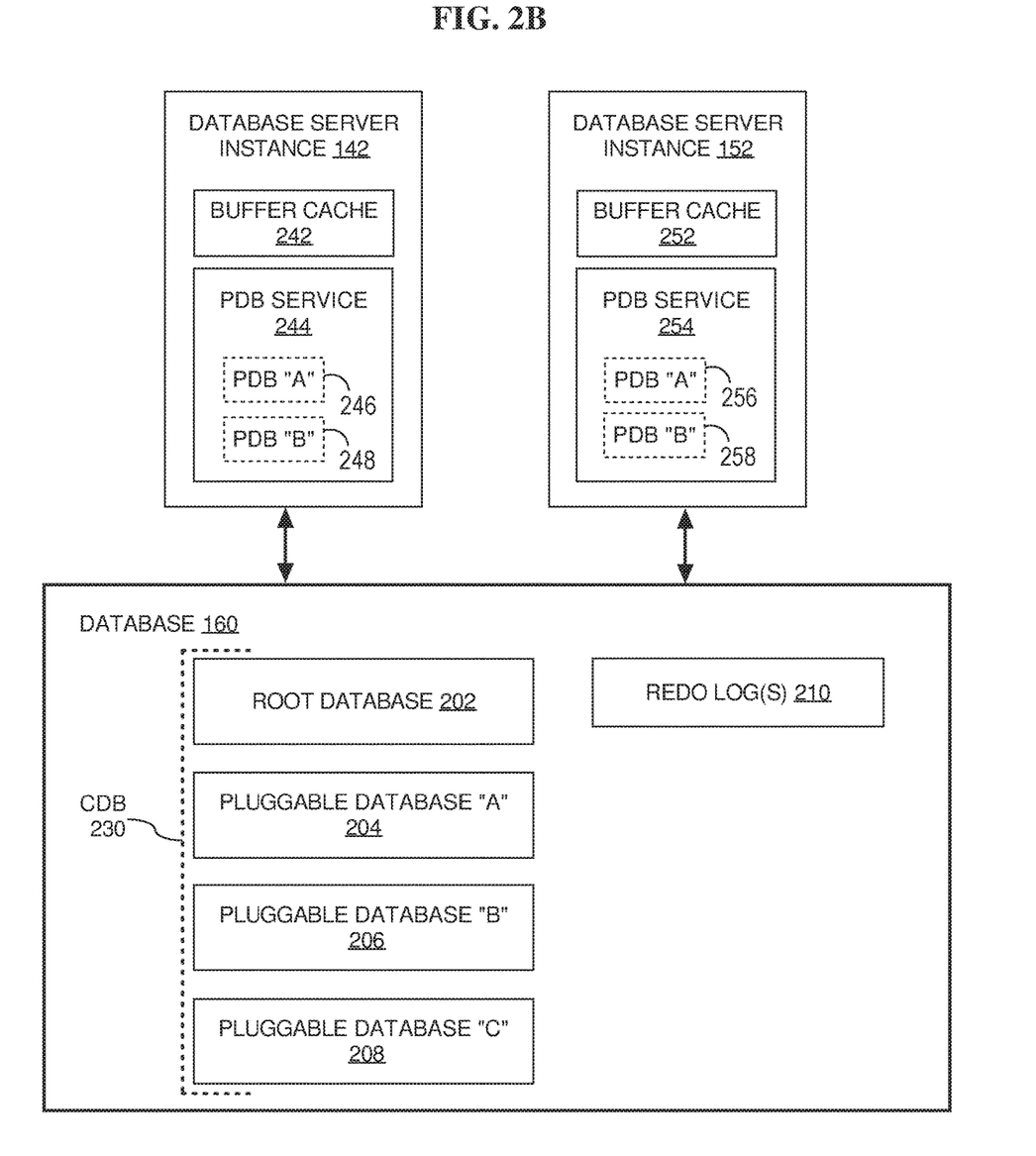
Figure 2C:
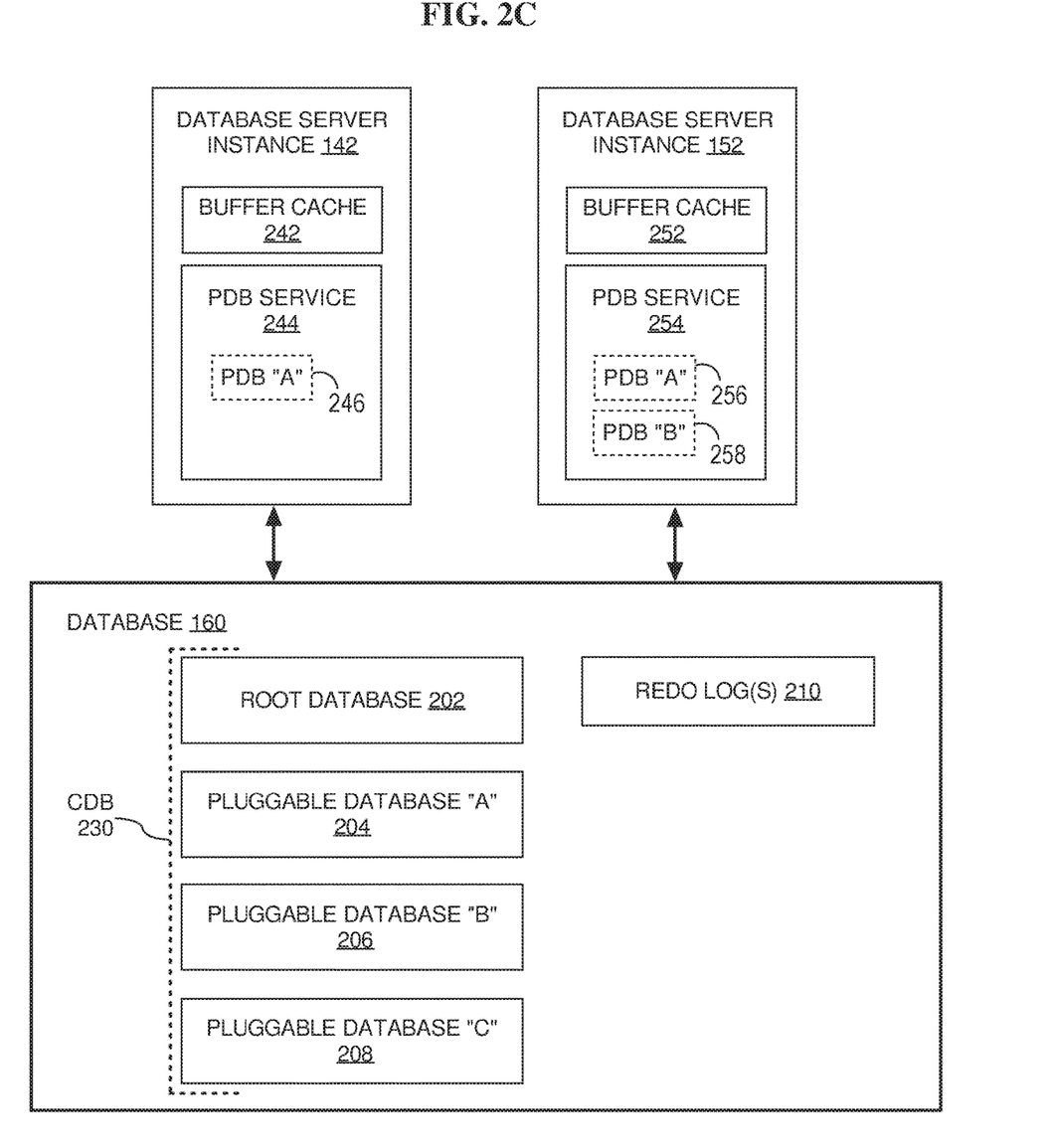

FIGS. 2A-2C depict example resource arrangements detailing database server instances and a database. Specifically, FIG. 2A is a detailed depiction of database server instances 142 and 152, and also of database 160. Specifically, database 160 includes a root database 202 that represents the data for a container database (CDB) 230. CDB 230 contains pluggable databases (PDB) "A" (204), PDB "B" (206) and PDB "C" (208). According to embodiments, CDB 230 may contain any number of pluggable databases, notwithstanding the number of pluggable databases depicted in FIG. 2A. Database 160 also includes redo log(s) 210.

Redo log(s) 210 includes a distinct redo thread for each database server instance serving database 160. A redo thread for a particular database server instance is a set of redo logs that are specific to that instance and stores redo entries recording actions taken by only the associated instance. The pluggable databases of a container database such as CDB 230 share a single set of redo records, such as redo log(s) 210, which are maintained by the container database. The redo records correspond to all changes made to databases within the container database. The redo records are ordered in time using a shared logical clock service that assigns each redo record a logical timestamp.

A container database, such as CDB 230, that includes one or more pluggable databases provides in-database virtualization for consolidating the multiple separate pluggable databases. Pluggable databases may be "plugged in" to a container database, and the container database may be transported between database servers and/or DBMSs. When a database server run on a cluster of nodes serves a CDB (such as CDB 230), service to one or more pluggable databases (e.g., PDBs 204, 206, and/or 208) in the CDB may be initiated or terminated on any database server instance (on a node in the cluster) serving the CDB. As such, the computing resources of a single database server or instance may be shared between multiple pluggable databases.

When service to a particular PDB is terminated at a particular database server instance, the particular PDB remains in the container database that hosts the PDB. Furthermore, termination of service to the particular PDB at a particular instance does not affect service to the particular PDB at other instances serving the PDB. A particular database server instance initiating service to a particular PDB is referred to herein as "opening" the PDB on the instance, and a particular database server instance terminating service to a particular PDB is referred to herein as "closing" the PDB on the instance. Migrating a particular PDB between database server instances involves closing the PDB at a first instance and opening the PDB at a second and distinct instance.

Root Database

Root database 202 is a database used to globally manage CDB 230, and to store metadata and/or data for "common database objects" to manage access to PDBs 204, 206, and 208. Although root database 202 is depicted in FIG. 2A, i.e., as a separate database within database 160, other architectural implementations for storing common database objects for a container database may be used within embodiments.

Migrating a Pluggable Database Between Database Server Instances

Many times, there are performance benefits when service to a particular PDB is restricted to less than all nodes in a cluster. For example, as depicted in PDB service information 244 (containing PDB open records 246 and 248) in FIG. 2A, database server instance 142 maintains service for PDB "A" (204) and PDB "B" (206). Also, as depicted in PDB service information 254 (containing PDB open record 256), database server instance 152 maintains service for only PDB "A" (204). As shown in FIG. 2A, neither of instances 142 and 152 currently maintain service for PDB "C" (208).

Furthermore, performance considerations may require moving service of a PDB from one database server instance to another. However, generally, closing a PDB on a database server instance causes the instance to close connections to the PDB as quickly as possible. If the PDB is closed on a source instance and the PDB is opened on the destination instance without coordination, closing the connections on the source instance as quickly as possible causes a flood of connection requests at the new location of the PDB. The flood of connection causes various problems with respect to performance at the destination instance. For example, the flood of requests require resources and may require the CPU usage of the destination node to spike. Also, a high rate of connection requests generally require mutually exclusive locks, i.e., on resources needed for other connection requests.

Figure 3:
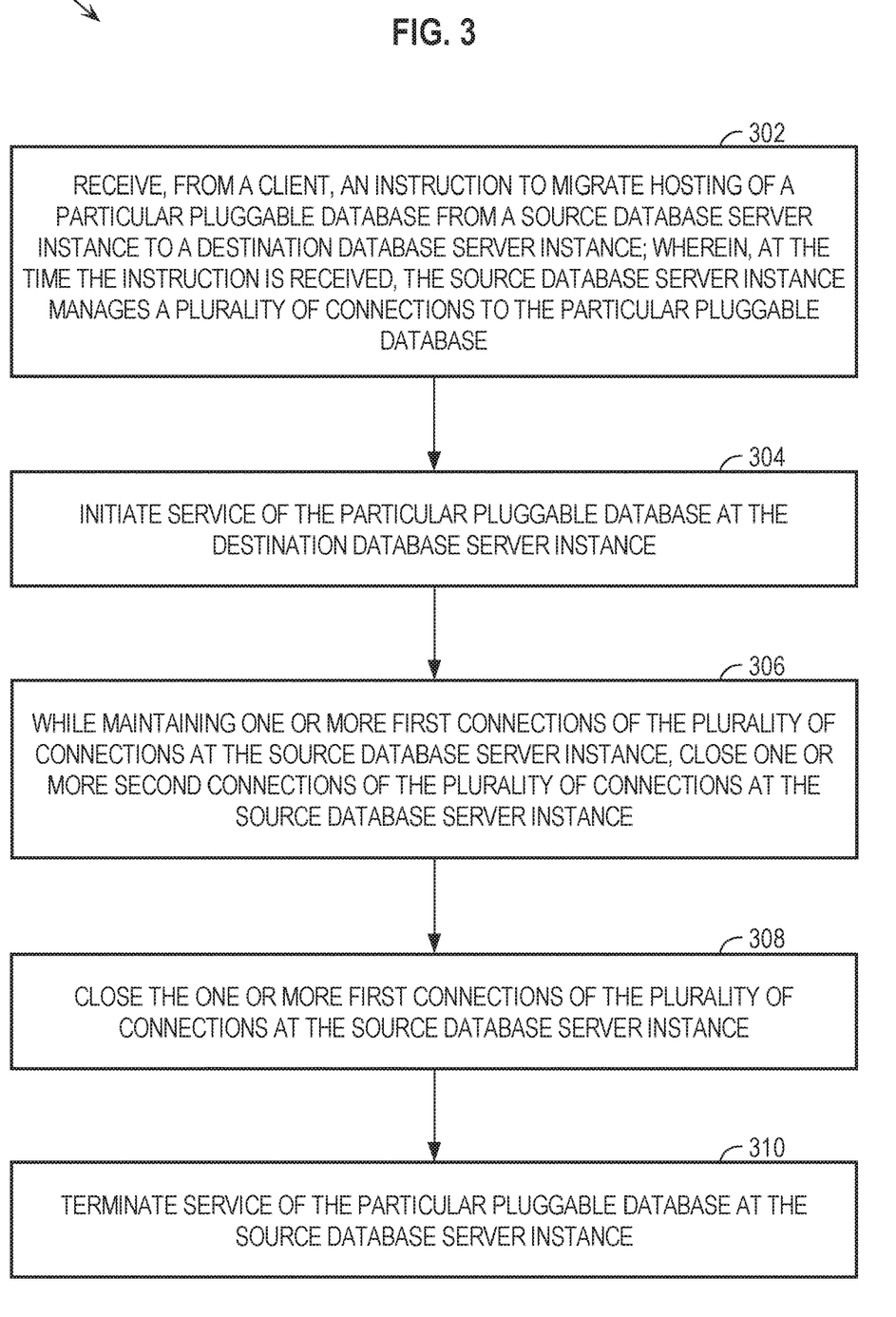
FIG. 3 depicts a flowchart for execution of a single instruction, from a client, that causes migration of a PDB between database server instances such that application performance is minimally impacted.

As such, FIG. 3 depicts a flowchart 300 for execution of a single instruction, from a client, that causes migration of a PDB between database server instances. Since the migration is triggered by a single instruction, DBMS 130 coordinates the migration such that application performance is minimally impacted.

At step 302, an instruction to migrate hosting of a particular pluggable database from a source database server instance to a destination database server instance is received from a client; wherein, at the time the instruction is received, the source database server instance manages a plurality of connections to the particular pluggable database. For example, database client 112 sends a command to DBMS 130, which command instructs DBMS 130 to migrate PDB "B" (206) from a source instance (database server instance 142) to a destination instance (database server instance 152). In other words, the command requires the database server instance that manages PDB "B" (or facilitates communication with PDB "B") to be changed from a source database server instance to a destination database server instance.

At the time that DBMS 130 receives the migration command, database server instances 142 and 152 maintain service to PDBs as depicted in FIG. 2A. Specifically, as depicted in FIG. 2A, database server instance 142 maintains service for PDB "B" and database server instance 152 does not maintain service for PDB "B". In providing service for PDB "B", database server instance 142 maintains a plurality of connections to PDB "B" that are utilized by users of the PDB's data to access that data. Through any of these connections, a user may read from and/or write to the data for PDB "B", etc.

According to embodiments, receipt of the command to migrate PDB "B" triggers steps 304-310 of flowchart 300, which perform coordinated migration of the pluggable database between the source and the destination database server instances.

At step 304, in response to receiving the migration instruction, service of the particular pluggable database is initiated at the destination database server instance. For example, before closing PDB "B" on database server instance 142, DBMS 130 opens PDB "B" on database server instance 152, as depicted in FIG. 2B (in which both database server instances 142 and 152 maintain service for PDB "B"). Thus, for a period of time, PDB "B" is open on both the source instance and the destination instance.

Because the PDB migration process is triggered by a single command, DBMS 130 has increased opportunity to time the opening and closing of the PDB in a way that efficiently utilizes resources and thus minimizes impact on node resources caused by the migration.

Paced Migration of Pluggable Database Connections

At step 306, while maintaining one or more first connections of the plurality of connections at the source database server instance, one or more second connections of the plurality of connections are closed at the source database server instance. For example, while the subject PDB (PDB "B") is open on both the source and destination instances as depicted in FIG. 2B, DBMS 130 gradually closes connections (either forcefully or gracefully) at the source instance (instance 142) over a period of time. Closing the connections, to PDB "B" on instance 142, over a period of time allows these connections to be gradually reestablished at the destination instance (instance 152), which avoids causing a flood of connection requests to be received at the destination instance.

According to an embodiment, connections are closed at the source instance at a connection closure rate identified by DBMS 130. DBMS 130 may identify this connection closure rate in data for the migration command. For example, the connection closure rate may be provided, by the database user, as an argument to the migration instruction. To illustrate, a user indicates, via an argument to the migration instruction that causes migration of PDB "B" from instance 142 to instance 152, that the connections should all be closed at instance 142 in two minutes. Based on the number of connections to PDB "B" at instance 142, DBMS 130 calculates a connection closure rate for connections to PDB "B" at instance 142 such that, when connections are closed at the calculated rate, all connections are closed within the given amount of time.

According to an embodiment, the connection closure rate is the default rate of connection closure used by DBMS 130. The connection closure rate may be in the form of an amount of time over which PDB connections should be closed at the source instance, or in the form of a rate of connections per unit time at which PDB connections should be closed at the source instance.

According to another embodiment, DBMS 130 automatically determines the connection closure rate based, at least in part, on statistics maintained for at least one of: the subject PDB (e.g., PDB "B"), database 160, a container database that contains the particular pluggable database, the source database server instance, or the destination database server instance. For example, these statistics comprise one or more of: the rate of connection initiation requests for PDB "B" at the destination instance; the number of connections to PDB "B" maintained by the source instance at the time that the migration instructions is received; the size of the data stored for PDB "B" in CDB 230; a rate of query execution on the destination instance; one or more transaction rates for PDB "B" resources at the source and/or destination instance; a measure of processing power of the destination instance; etc.

For example, DBMS 130 calculates the connection closure rate based on the rate of transactions for PDB "B" at source instance 142. Such determinations may be based on mapping data that maps closure rates to set thresholds for transaction rates. According to embodiments, based on the mapping data, DBMS 130 causes connection closures to be performed more quickly when there are lower transaction rates for the source PDB at the source instance.

To illustrate, DBMS 130 determines that the rate of transactions for PDB "B" in instance 142 is below a first threshold (e.g., where the first rate threshold is 1 transaction per second). In response, DBMS 130 sets the connection closure rate, for closing connections to PDB "B" at the source instance, at a closure rate that is mapped, in mapping data, to transaction rates less than the first threshold (e.g., closing ten connections per minute).

As a further illustration, DBMS 130 determines that the rate of transactions for PDB "B" in instance 142 is above the first threshold and below a second threshold (that is higher than the first threshold, e.g., where the second rate threshold is 5 transactions per second). In response, DBMS 130 sets the connection closure rate, for closing connections to PDB "B" at the source instance, at a closure rate that is mapped, in mapping data, to transaction rates greater than the first threshold and less than the second threshold (e.g., closing six connections per minute).

As yet further illustration, DBMS 130 determines that rate of transactions for PDB "B" in instance 142 is above the second threshold. In response, DBMS 130 sets the connection closure rate, for closing connections to PDB "B" at the source instance, at a closure rate that is mapped, in mapping data, to transaction rates greater than the second threshold (e.g., closing two connections per minute).

According to embodiments, DBMS 130 determines the connection closure rate based on an amount of time over which the connections to the subject PDB are to be gradually closed. Based on an amount of time over which the connections are to be closed, DBMS 130 determines the connection closure rate to be one or more of: a single steady rate based on which all connections to the subject PDB at the source instance will be closed in the specified amount of time; a number of groups of connections, to the subject PDB at the source instance, to be closed at intervals over the specified amount of time; two or more different connection closure rates to be used during the specified amount of time in order to close all connections to the subject PDB at the source instance in the specified amount of time; etc.

According to embodiments, connections are terminated at the source instance in any number of ways. For example, the instance 142 forcefully closes connections to PDB "B". An instance forcefully closes a connection by, for example, forcing immediate termination of operations initiated via the connection, i.e., without allowing further processing to be performed on those operations.

As another example, the instance 142 sends one or more messages to a connection pool informing the connection pool that PDB "B" will soon be unavailable at the source instance 142. These one or more messages initiate a drain timeout (which represents an amount of time before the connections to the closing PDB will be terminated) for a connection manager managing the connection pool. The drain timeout allows the connections, in the connection pool, that are connected to the PDB "B" through instance 142 to close gracefully. For example, an instance gracefully closes a connection by coordinating termination, of operations initiated via the connection, with applications that requested the operations thereby allowing the applications to perform termination processing prior to the connection closure. According to embodiments, the drain timeout causes the connections to PDB "B" through instance 142 to gracefully close by a known point in time indicated by the drain timeout, which may be based on the connection closure rate identified by DMBS 130.

At step 308, after a certain amount of time (where the certain amount of time is initiated when the migration instruction is received), the one or more first connections of the plurality of connections are closed at the source database server instance. For example, DMBS 130 identifies six connections per minute to be the connection closure rate for PDB "B" at instance 142 (source instance). In this example, at the time of DBMS 130 receiving the migration instruction, instance 142 maintained 24 connections to PDB "B". Because DBMS 130 causes instance 142 to close the instance's connections to PDB "B" at the identified rate of six connections per minute, the last of the connections to PDB "B" at instance 142 are closed around four minutes after the migration instruction is received by DMBS 130. Thus, closing the connections at the source instance based on an identified connection closure rate causes some connections to be closed after a certain amount of time passes from when DBMS 130 first receives the migration instruction.

At step 310, after the certain amount of time, service of the particular pluggable database is terminated at the source database server instance. For example, after all of the connections to PDB "B" are closed at instance 142, DBMS 130 terminates service to (or closes) PDB "B" at instance 142. Thus, as depicted in FIG. 2C, DBMS 130 has migrated service of PDB "B" from instance 142 to instance 152 since database server instance 142 no longer maintains service to PDB "B" and database server instance 152 does maintain service to PDB "B".

Initiating Connections to the PDB at the Destination Instance

When DBMS 130 closes connections on source instance 142, those users/applications that still need to access the data in PDB "B" initiate new connections with PDB "B" at destination instance 152. For example, when an application running at client device 110 determines that its connection with PDB "B" through instance 142 has been closed, the application requests new connection information from a database listener for PDB "B". According to embodiment, the database listener is a connection manager for a connection pool of which the terminated connection is a part. When PDB "B" is opened or closed on a given database server instance, the PDB registers that information with the database listener for PDB "B".

According to one embodiment, while PDB "B" is open on both source instance 142 and destination instance 152, the listener for PDB "B" directs connection requests to both instance 142 and instance 152. In this way, at least a portion of connections that are closed on source instance 142 are redirected to destination instance 152 since some of the closed connections will reconnect at instance 152.

According to another embodiment, once PDB "B" is open on the destination instance 152, source instance 142 registers information, with the listener for PDB "B", indicating that PDB "B" is no longer available on source instance 142. In this way, no new connection requests are directed to source instance 142. Accordingly, once PDB "B" is open on the destination instance 152, instance 152 registers information, with the listener for PDB "B", indicating that PDB "B" is available on destination instance 152, which provides the listener with the information needed to direct new connection requests to the destination instance.

Therefore, since DBMS 130 closes the connections to PDB "B" on instance 142 gradually over a period of time, the users/applications gradually initiate connections with PDB "B" on instance 152 over approximately the same period of time. In this way, the connection initiation requests do not flood destination instance 152.

Cache Sharing

According to embodiments, database server instances in a cluster are able to share data stored in the buffer caches of the instances. More specifically, a database server instance can retrieve data blocks from the buffer cache of another instance in the cluster rather than retrieving the needed blocks from disk. An example implementation of such cache sharing is Cache Fusion on Oracle RAC. (See U.S. Pat. No. 6,353,836, titled "Method And Apparatus For Transferring Data From The Cache Of One Node To The Cache Of Another Node", which is incorporated herein by reference.)

Part of closing a pluggable database on a particular database server instance involves flushing all data blocks, for the pluggable database from the buffer cache of the instance, to persistent storage (i.e., in database 160). According to embodiments, DBMS 130 delays causing the source database server instance to flush the data blocks, for a migrating PDB, from its buffer cache after DBMS 130 receives the instruction to migrate the PDB. During this delay, the destination database server instance may retrieve data blocks, for the subject PDB, directly from the source instance's buffer cache. Since retrieving the data from the buffer cache of the source instance is less costly than retrieving the data from persistent storage, taking advantage of cache sharing frees up resources of the destination instance to complete other tasks more quickly.

For example, after instance 152 opens PDB "B" and before instance 142 closes PDB "B", as depicted in FIG. 2B, instance 152 requires a particular data block from PDB "B" that instance 152 does not have in buffer cache 252. Before requesting the particular data block from database 160, database server instance 152 firsts sends a request for the data block to a cache sharing system which, in turn, forwards the request to database server instance 142. Instance 142 determines whether the particular data block is stored in buffer cache 242. In response to determining that the particular data block is stored in buffer cache 242, instance 142 sends the data block retrieved from buffer cache 242 to database server instance 152. Database server instance 152 stores the particular data block in buffer cache 252 for use in fulfilling requests for the data.

According to one embodiment, the amount of delay before flushing the data blocks for a subject PDB from the buffer cache of the source instance is the same amount of time over which connections to the PDB are closed at the source instance. In this embodiment, the source instance flushes data blocks for the migrated PDB from the buffer cache of the source instance once the connections to the PDB are all closed at the source instance.

According to another embodiment, the amount of delay before flushing the data blocks for a subject PDB from the buffer cache of the source instance is different than the amount of time over which connections to the PDB are closed at the source instance. According to embodiments, a source database server instance managing the source PDB identifies an amount of time to delay flushing the data blocks for the source PDB from its buffer cache, where the delay is initiated: once all of the connections to a source PDB are closed, once the amount of time for the delay is identified, etc.

According to an embodiment, the source database server instance determines when the amount of delay time has passed based on when the migration command is received. In this embodiment, if more than the amount of time has passed once the amount of time is determined, then the source database server instance delays no more time before flushing the buffers. In other words, upon determining that the amount of time to delay took more time than is indicated by the amount of delay time itself, the source database server instance immediately flushes the dirty data blocks, that were stored for the source PDB, from the buffer cache.

The timing of this delay allows the destination database server instance time to request data blocks, from the buffer cache of the source database server instance, to service the users utilizing the connections that have later migrated from the source PDB to the destination PDB.

For example, instance 142 flushes the data blocks for PDB "B", from buffer cache 242, once a particular amount of time expires after the connections to PDB "B" have all been closed at instance 142. This particular amount of time may be (a) a default amount of time, or (b) may be an amount of time provided in data for the migration instruction (e.g., as an argument in the instruction), etc. In these cases, instance 142 identifies the particular amount of time to delay flushing the dirty data blocks, that are from PDB "B" in buffer cache 242, (a) based on the default amount of time, or (b) based on data for the migration instruction.

According to embodiments, database server instance 142 identifies the amount of delay before flushing the data blocks for PDB "B" from buffer cache 242 based, at least in part, on statistics comprising one or more of: a number of dirty buffers for PDB "B" in the buffer cache of the source instance; the size of one or more caches maintained for PDB "B" on the source instance and/or on the destination instance; a measure of processing power of the destination instance; etc.

To illustrate, DBMS 130 determines the amount of delay before flushing the data blocks for PDB "B" from buffer cache 242 (called herein "delay time") based on the number of dirty buffers in buffer cache 242 of instance 142. Such determinations may be based on mapping data that maps potential delay times to set thresholds for numbers of dirty buffers. According to embodiments, based on the mapping data, DBMS 130 causes the delay time to be shorter when there are fewer dirty buffers for the source PDB in the source database server instance buffer cache.

To illustrate, DBMS 130 determines that the number of dirty buffers for PDB "B" in buffer cache 242 is below a first threshold (e.g., 10 data blocks). In response, DBMS 130 sets the delay time, after which time the dirty buffers for PDB "B" will be flushed from buffer cache 242, to an amount of time that is mapped, in mapping data, to dirty buffer numbers less than the first threshold (e.g., one minute of delay time).

As a further illustration, DBMS 130 determines that the number of dirty buffers for PDB "B" in buffer cache 242 is above the first threshold and below a second threshold (that is higher than the first threshold, e.g., 30 data blocks). In response, DBMS 130 sets the delay time, after which time the dirty buffers for PDB "B" will be flushed from buffer cache 242, to an amount of time that is mapped, in mapping data, to dirty buffer numbers greater than the first threshold and less than the second threshold (e.g., three minutes of delay time).

As yet further illustration, DBMS 130 determines that the number of dirty buffers for PDB "B" in buffer cache 242 is above the second threshold. In response, DBMS 130 sets the delay time, after which time the dirty buffers for PDB "B" will be flushed from buffer cache 242, to an amount of time that is mapped, in mapping data, to dirty buffer numbers greater than the second threshold (e.g., six minutes of delay time).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
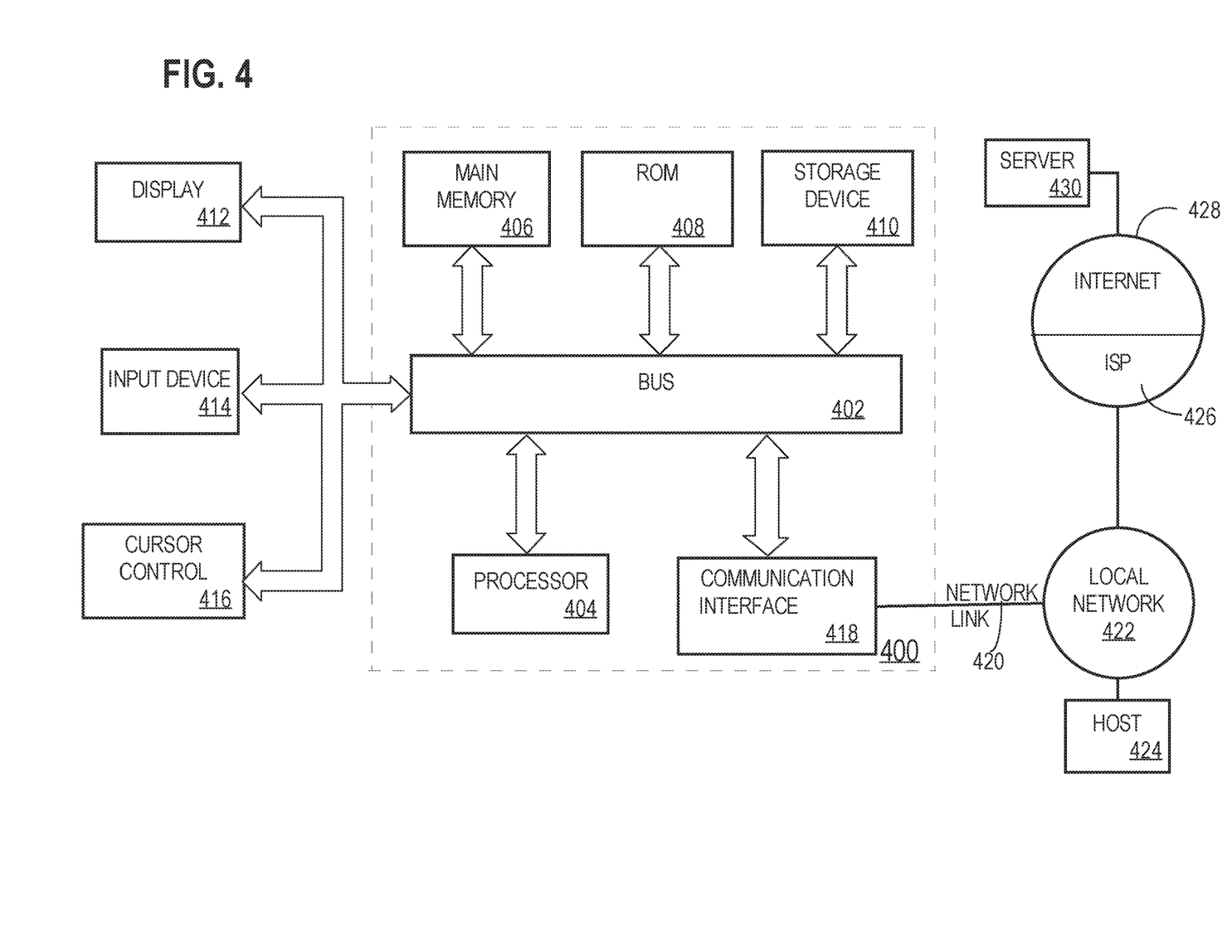
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A computer-implemented method comprising:
  receiving, from a client, an instruction to migrate hosting of a particular pluggable database from a source database server instance to a destination database server instance;

wherein, at a time the instruction is received, a connection manager for the source database server instance manages a plurality of connections to the particular pluggable database;

wherein receiving the instruction triggers:

initiating service of the particular pluggable database at the destination database server instance;

the source database server instance providing one or more messages to the connection manager, wherein the one or more messages indicate unavailability of the particular pluggable database;

wherein, based on the one or more messages, the connection manager closes one or more connections of the plurality of connections at the source database server instance while maintaining at least one connection of the plurality of connections;

after the connection manager closes the one or more connections, terminating service of the particular pluggable database at the source database server instance;

wherein, upon said terminating service of the particular pluggable database at the source database server instance, all of the plurality of connections to the particular pluggable database at the source database server instance are closed;

wherein the method is performed by one or more computing devices.

2. The method of claim 1, further comprising, after initiating service of the particular pluggable database at the destination database server instance:

receiving a request to initiate a connection to the particular pluggable database; and initiating the requested connection, to the particular pluggable database, at the destination database server instance.

3. The method of claim 1, wherein, at the time the instruction is received, the destination database server instance does not maintain service of the particular pluggable database.

4. The method of claim 1, wherein:

a particular container database contains the particular pluggable database; and data in the particular container database is accessible to both the source database server instance and the destination database server instance.

5. The method of claim 1, further comprising:

determining a particular rate of connection closure, for closing the plurality of connections, based, at least in part, on one or more statistics maintained for at least one of: the particular pluggable database, a container database that contains the particular pluggable database, the source database server instance, or the destination database server instance;

wherein terminating service is performed after a particular amount of time from receiving the instruction; and determining the particular amount of time based on the determined particular rate of connection closure.

6. The method of claim 1 further comprising:

after receiving the instruction to migrate hosting of the particular pluggable database and before terminating service of the particular pluggable database at the source database server instance:

the destination database server instance requesting a particular data block from the source database server instance;

the source database server instance determining whether the particular data block is in a buffer cache of the source database server instance; and in response to determining that the particular data block is in the buffer cache of the source database server instance, the source database server instance sending, to the destination database server instance, the particular data block from the buffer cache.

7. The method of claim 1 further comprising, after a particular amount of time has passed, the source database server instance flushing, from a buffer cache, data blocks related to the particular pluggable database.

8. A computer-implemented method comprising:

receiving, from a client, an instruction to migrate hosting of a particular pluggable database from a source database server instance to a destination database server instance;

wherein, at a time the instruction is received, a buffer cache managed by the source database server instance includes one or more dirty data blocks, which are data blocks from the particular pluggable database;

wherein receiving the instruction triggers:

initiating service of the particular pluggable database at the destination database server instance;

identifying a particular amount of time to delay flushing the one or more dirty data blocks from the buffer cache;

determining that the particular amount of time has passed; and in response to determining that the particular amount of time has passed, flushing the one or more dirty data blocks from the buffer cache;

after receiving the instruction to migrate and while the one or more dirty data blocks are in the buffer cache, the destination database server instance retrieving the one or more dirty data blocks from the buffer cache;

wherein the method is performed by one or more computing devices.

9. The method of claim 8, wherein determining that the particular amount of time has passed comprises initiating accounting of the particular amount of time when the particular amount of time is identified.

10. The method of claim 8, wherein determining that the particular amount of time has passed comprises initiating accounting of the particular amount of time when instruction to migrate hosting is received.

11. The method of claim 8, wherein:

identifying the particular amount of time to delay flushing the one or more dirty data blocks from the buffer cache is based, at least in part, on one or more statistics; and the one or more statistics comprises one or more of:

a number of dirty buffers for the particular pluggable database in the buffer cache;

one of more sizes of one or more caches maintained for the particular pluggable database; or a measure of processing power of the destination database server instance.

12. The computer-implemented method of claim 8, wherein the destination database server instance retrieving the one or more dirty data blocks from the buffer cache comprises:

the destination database server instance sending a request for the one or more dirty data blocks to a cache sharing system;

in response to receiving the request for the one or more dirty data blocks, the cache sharing system forwarding the request for the one or more dirty data blocks to the source database server instance;

in response to receiving the request for the one or more dirty data blocks, the source database server instance sending the one or more dirty data blocks to the destination database server instance;

wherein the destination database server instance stores the one or more dirty data blocks in cache.

13. One or more non-transitory computer-readable media storing instructions that, when executed by one or more processors, cause:

receiving, from a client, an instruction to migrate hosting of a particular pluggable database from a source database server instance to a destination database server instance;

wherein, at a time the instruction is received, a connection manager for the source database server instance manages a plurality of connections to the particular pluggable database;

wherein receiving the instruction triggers:
initiating service of the particular pluggable database at the destination database server instance;
the source database server instance providing one or more messages to the connection manager, wherein the one or more messages indicate unavailability of the particular pluggable database;
wherein, based on the one or more messages, the connection manager closes one or more connections of the plurality of connections at the source database server instance while maintaining at least one connection of the plurality of connections;
after the connection manager closes the one or more connections, terminating service of the particular pluggable database at the source database server instance;
wherein, upon said terminating service of the particular pluggable database at the source database server instance, all of the plurality of connections to the particular pluggable database at the source database server instance are closed.

14. The one or more non-transitory computer-readable media of claim 13, wherein the instructions further comprise instructions that, when executed by one or more processors, cause:

after initiating service of the particular pluggable database at the destination database server instance:
receiving a request to initiate a connection to the particular pluggable database; and
initiating the requested connection, to the particular pluggable database, at the destination database server instance.

15. The one or more non-transitory computer-readable media of claim 13, wherein, at the time the instruction is received, the destination database server instance does not maintain service of the particular pluggable database.

16. The one or more non-transitory computer-readable media of claim 13, wherein:
a particular container database contains the particular pluggable database; and
data in the particular container database is accessible to both the source database server instance and the destination database server instance.

17. The one or more non-transitory computer-readable media of claim 13, wherein the instructions further comprise instructions that, when executed by one or more processors, cause:

determining a particular rate of connection closure, for closing the plurality of connections, based, at least in part, on one or more statistics maintained for at least one of: the particular pluggable database, a container database that contains the particular pluggable database, the source database server instance, or the destination database server instance;
wherein terminating service is performed after a particular amount of time from receiving the instruction; and
determining the particular amount of time based on the determined particular rate of connection closure.

18. The one or more non-transitory computer-readable media of claim 13, wherein the instructions further comprise instructions that, when executed by one or more processors, cause:

after receiving the instruction to migrate hosting of the particular pluggable database and before terminating service of the particular pluggable database at the source database server instance:
the destination database server instance requesting a particular data block from the source database server instance;
the source database server instance determining whether the particular data block is in a buffer cache of the source database server instance; and
in response to determining that the particular data block is in the buffer cache of the source database server instance, the source database server instance sending, to the destination database server instance, the particular data block from the buffer cache.

19. The one or more non-transitory computer-readable media of claim 13, wherein the instructions further comprise instructions that, when executed by one or more processors, cause, after a particular amount of time has passed, the source database server instance flushing, from a buffer cache, data blocks related to the particular pluggable database.

20. One or more non-transitory computer-readable media storing instructions that, when executed by one or more processors, cause:

receiving, from a client, an instruction to migrate hosting of a particular pluggable database from a source database server instance to a destination database server instance;

wherein, at a time the instruction is received, a buffer cache managed by the source database server instance includes one or more dirty data blocks, which are data blocks from the particular pluggable database;

wherein receiving the instruction triggers:
initiating service of the particular pluggable database at the destination database server instance;
identifying a particular amount of time to delay flushing the one or more dirty data blocks from the buffer cache;
determining that the particular amount of time has passed; and
in response to determining that the particular amount of time has passed, flushing the one or more dirty data blocks from the buffer cache;
after receiving the instruction to migrate and while the one or more dirty data blocks are in the buffer cache, the destination database server instance retrieving the one or more dirty data blocks from the buffer cache.

21. The one or more non-transitory computer-readable media of claim 20, wherein determining that the particular amount of time has passed comprises initiating accounting of the particular amount of time when the particular amount of time is identified.

22. The one or more non-transitory computer-readable media of claim 20, wherein determining that the particular amount of time has passed comprises initiating accounting of the particular amount of time when instruction to migrate hosting is received.

23. The one or more non-transitory computer-readable media of claim 20, wherein:
- identifying the particular amount of time to delay flushing the one or more dirty data blocks from the buffer cache is based, at least in part, on one or more statistics; and
- the one or more statistics comprises one or more of:
  - a number of dirty buffers for the particular pluggable database in the buffer cache;
  - one or more sizes of one or more caches maintained for the particular pluggable database; or
  - a measure of processing power of the destination database server instance.

24. The one or more non-transitory computer-readable media of claim 20, wherein the destination database server instance retrieving the one or more dirty data blocks from the buffer cache comprises:
- the destination database server instance sending a request for the one or more dirty data blocks to a cache sharing system;
- in response to receiving the request for the one or more dirty data blocks, the cache sharing system forwarding the request for the one or more dirty data blocks to the source database server instance;
- in response to receiving the request for the one or more dirty data blocks, the source database server instance sending the one or more dirty data blocks to the destination database server instance;
- wherein the destination database server instance stores the one or more dirty data blocks in cache.

* * * * *

UNITED STATES PATENT AND TRADEMARK OFFICE
CERTIFICATE OF CORRECTION

PATENT NO. : 10,635,674 B2
APPLICATION NO. : 15/093506
DATED : April 28, 2020
INVENTOR(S) : Jain et al.

Page 1 of 1

It is certified that error appears in the above-identified patent and that said Letters Patent is hereby corrected as shown below:

In the Claims

In Column 16, Line 55, in Claim 11, delete "of" and insert -- or --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*